United States Patent

Mühlfeld et al.

(10) Patent No.: US 7,048,974 B2
(45) Date of Patent: May 23, 2006

(54) LIQUID CRYSTAL MIXTURES

(75) Inventors: Antje Mühlfeld, Salzgitter/Ringelheim (DE); Michael Junge, Pfungstadt (DE); Harald Hirschmann, Darmstadt (DE); Sabine Schoen, Herten (DE); Juliane Suermann, Darmstadt (DE); Ursula Patwal, Reinheim/Georgenhausen (DE); Dagmar Zimmermann, Gross-Gerau (DE)

(73) Assignee: Merck Patentgesellschaft Mit Beschrankter Haftung, Berlin (DE)

( * ) Notice: Subject to any disclaimer, the term of this patent is extended or adjusted under 35 U.S.C. 154(b) by 0 days.

(21) Appl. No.: 10/478,502

(22) PCT Filed: Apr. 25, 2002

(86) PCT No.: PCT/EP02/04573

§ 371 (c)(1),
(2), (4) Date: Nov. 24, 2003

(87) PCT Pub. No.: WO02/097005

PCT Pub. Date: Dec. 5, 2002

(65) Prior Publication Data

US 2004/0149956 A1    Aug. 5, 2004

(51) Int. Cl.
*C09K 19/34* (2006.01)
*C09K 19/30* (2006.01)
*C09K 19/20* (2006.01)
*C09K 19/12* (2006.01)

(52) U.S. Cl. ............ 428/1.1; 252/299.61; 252/299.63; 252/299.66; 252/299.67

(58) Field of Classification Search .......... 252/299.61, 252/299.63, 299.67, 299.66; 428/1.1
See application file for complete search history.

(56) References Cited

U.S. PATENT DOCUMENTS

| 5,714,087 | A | | 2/1998 | Pausch et al. |
| 5,919,396 | A | * | 7/1999 | Tarumi et al. ......... 252/299.01 |
| 5,976,407 | A | * | 11/1999 | Tarumi et al. ......... 252/299.01 |
| 5,993,691 | A | * | 11/1999 | Pausch et al. ......... 252/299.63 |
| 6,017,469 | A | | 1/2000 | Reiffenrath et al. |
| 6,045,878 | A | * | 4/2000 | Tarumi et al. ............. 349/182 |
| 6,054,193 | A | | 4/2000 | Hirschmann et al. |
| 6,080,452 | A | * | 6/2000 | Tarumi et al. ................ 428/1.1 |
| 6,146,720 | A | * | 11/2000 | Pausch et al. ................ 428/1.1 |
| 6,440,506 | B1 | | 8/2002 | Kojima et al. |
| 6,582,782 | B1 | * | 6/2003 | Heckmeier et al. .......... 428/1.1 |
| 6,749,907 | B1 | * | 6/2004 | Heckmeier et al. .......... 428/1.1 |
| 6,858,268 | B1 | * | 2/2005 | Suermann et al. ........... 428/1.1 |
| 6,887,532 | B1 | * | 5/2005 | Okabe et al. ................. 428/1.1 |
| 6,902,777 | B1 | * | 6/2005 | Hirschmann et al. ........ 428/1.1 |
| 2002/0017634 | A1 | * | 2/2002 | Heckmeier et al. .... 252/299.67 |

FOREIGN PATENT DOCUMENTS

| DE | 19720296 | 12/1997 |
| DE | 19828149 | 1/1999 |
| DE | 10002689 | 8/2000 |
| DE | 10027066 | 1/2001 |
| DE | 10058474 | 7/2001 |
| EP | 1002848 | 5/2000 |
| EP | 1096000 | 5/2001 |
| WO | WO 9504789 | 2/1995 |
| WO | WO 9530723 | 11/1995 |

* cited by examiner

*Primary Examiner*—Shean C. Wu
(74) *Attorney, Agent, or Firm*—Millen, White, Zelano & Branigan, P.C.

(57) ABSTRACT

The invention relates to TN and STN liquid-crystal displays and to the nematic liquid-crystal mixtures used therein, characterised in that they comprise one or more compounds of the formula I

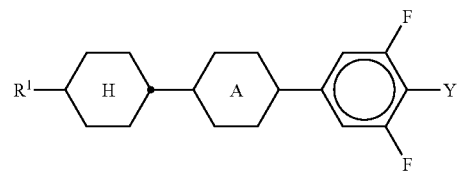

and one or more compounds of the formula II

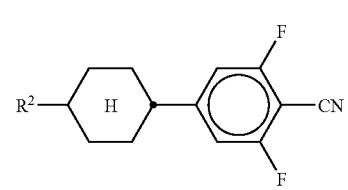

in which ring A, $R^1$, $R^2$ and Y are as defined in Claim 1.

13 Claims, No Drawings

LIQUID CRYSTAL MIXTURES

The invention relates to liquid-crystalline mixtures in twisted nematic (TN) and supertwisted nematic (STN) liquid-crystal displays having very short response times and good steepnesses and angle dependencies, and in particular their use.

TN displays are known, for example from M. Schadt and W. Helfrich, Appl. Phys. Lett., 18,127 (1971). STN displays are known, for example from EP 0 131 216 B1; DE 34 23 993 A1; EP 0 098 070 A2; M. Schadt and F. Leenhouts, 17th Freiburg Congress on Liquid Crystals (8.–10.04.87); K. Kawasaki et al., SID 87 Digest 391 (20.6); M. Schadt and F. Leenhouts, SID 87 Digest 372 (20.1); K. Katoh et al., Japanese Journal of Applied Physics, Vol. 26, No. 11, L 1784-L 1786 (1987); F. Leenhouts et al., Appl. Phys. Lett. 50 (21), 1468 (1987); H. A. van Sprang and H. G. Koopman, J. Appl. Phys. 62 (5), 1734 (1987); T. J. Scheffer and J. Nehring, Appl. Phys. Lett. 45 (10), 1021 (1984), M. Schadt and F. Leenhouts, Appl. Phys. Lett. 50 (5), 236 (1987) and E. P. Raynes, Mol. Cryst. Liq. Cryst. Letters Vol. 4 (1), pp. 1–8 (1986). The term STN here covers any relatively highly twisted display element having a twist angle with a value of between 160° and 360°, such as, for example, the display elements according to Waters et al. (C. M. Waters et al., Proc. Soc. Inf. Disp. (New York) (1985) (3rd Intern. Display Conference, Kobe, Japan), STN-LCDs (DE-A 35 03 259), SBE-LCDs (T. J. Scheffer and J. Nehring, Appl. Phys. Lett. 45 (1984) 1021), OMI-LCDs (M. Schadt and F. Leenhouts, Appl. Phys. Lett. 50 (1987), 236, DST-LCDs (EP-A 0 246 842) or BW-STN-LCDs (K. Kawasaki et al., SID 87 Digest 391 (20.6)).

STN displays are distinguished compared with standard TN displays by significantly better steepnesses of the electro-optical characteristic line and, associated therewith, better contrast values and by significantly lower angle dependence of the contrast.

Of particular interest are TN and STN displays having very short response times, in particular also at relatively low temperatures. In order to achieve short response times, the rotational viscosities $v_{20}$ of the liquid-crystal mixtures have hitherto been optimised using mostly monotropic additives having relatively high vapour pressure. However, the response times achieved were not adequate for every application.

In order to achieve a steep electro-optical characteristic line in the displays according to the invention, the liquid-crystal mixtures should have relatively large values for the ratio between the elastic constants $K_{33}/K_{11}$ and relatively small values for $\Delta\in/\in_\perp$, where $\Delta\in$ is the dielectric anisotropy and $\in_\perp$ is the dielectric constant perpendicular to the longitudinal molecular axis.

In addition to optimisation of the contrast and response times, further important requirements are made of mixtures of this type:
1. broad d/p window
2. high long-term chemical stability
3. high electrical resistance
4. low frequency and temperature dependence of the threshold voltage.

The parameter combinations achieved ate still far from adequate, in particular for high-multiplex STN displays (with a multiplex rate in the region of about 1/400), but also for medium- and low-multiplex STN displays (with multiplex rates in the region of about 1/64 and 1/16 respectively), and TN displays. This is partly attributable to the fact that the various requirements are affected in opposite manners by material parameters.

Thus, there continues to be a great demand for liquid-crystalline mixtures, in particular for TN and STN displays having very short response times at the same time as a large working-temperature range, high characteristic-line steepness, good angle dependence of the contrast and low threshold voltage which meet the above-mentioned requirements.

The invention has the object of providing TN and STN displays which do not have the above-mentioned disadvantages or only do so to a lesser extent and at the same time have short response times, in particular at low temperatures, and very good steepnesses.

It has now been found that this object can be achieved if use is made of nematic liquid-crystal mixtures which comprise one or more compounds of the formula I

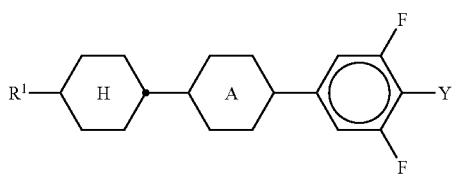

and one or more compounds of the formula II

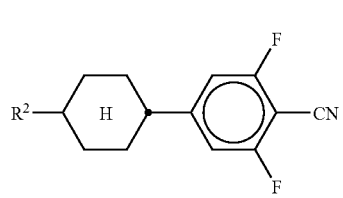

in which the individual radicals have the following meanings:

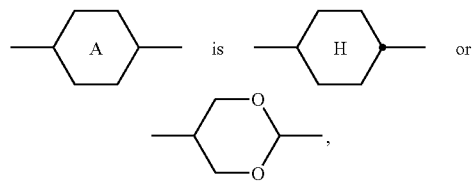

$R^1$ and $R^2$ are an alkyl or alkenyl radical having up to 15 carbon atoms which is unsubstituted, monosubstituted by CN or $CF_3$ or at least monosubstituted by halogen, where one or more $CH_2$ groups in these radicals may also be replaced by —O—, —S—, —C≡C—, —OC—O— or —O—CO— in such a way that O atoms are not linked directly to one another, Y is F, Cl or a halogenated alkyl, alkenyl or alkoxy radical having from 1 to 6 carbon atoms.

The use of the compounds of the formulae I and II in the mixtures for TN and STN displays according to the invention results in high steepness of the electro-optical characteristic line, low temperature dependence of the threshold voltage, and very fast response times, in particular at low temperatures.

The compounds of the formulae I and II significantly shorten, in particular, the response times of TN and STN mixtures while simultaneously increasing the steepness and low temperature dependence of the threshold voltage.

The mixtures according to the invention are furthermore distinguished by the following properties:

low viscosity,
low threshold voltage and operating voltage, and
long shelf lives in the display at low temperatures.

The invention furthermore relates to a liquid-crystal display having two outer plates, which, together with a frame, form a cell,
a nematic liquid-crystal mixture of positive dielectric anisotropy located in the cell,
electrode layers with alignment layers on the insides of the outer plates,
a tilt angle between the longitudinal axis of the molecules at the surface of the outer plates and the outer plates of from 0 degree to 30 degrees, and
a twist angle of the liquid-crystal mixture in the cell from alignment layer to alignment layer with a value of between 22.5° and 600°, characterised in that it contains a liquid-crystal mixture which comprises at least one compound of the formula I and at least one compound of the formula II.

In a particularly preferred embodiment, the mixture according to the invention consists of a nematic liquid-crystal mixture consisting of
a) 15–75% by weight of a liquid-crystalline component A consisting of one or more compounds having a dielectric anisotropy of greater than +1.5;
b) 25–85% by weight of a liquid-crystalline component B consisting of one or more compounds having a dielectric anisotropy of between −1.5 and +1.5;
c) 0–20% by weight of a liquid-crystalline component D consisting of one or more compounds having a dielectric anisotropy of below −1.5, and
d) if desired, an optically active component C in such an amount that the ratio between the layer thickness (separation of the outer plates) and the natural pitch of the chiral nematic liquid-crystal mixture is from about 0.2 to 1.3, where component A comprises at least one compound of the formula I and at least one compound of the formula II.

The invention also relates to corresponding liquid-crystal mixtures for use in TN and STN displays, in particular in medium- and low-multiplexed STN displays.

Formula I includes, in particular, compounds of the formulae I1 to I10

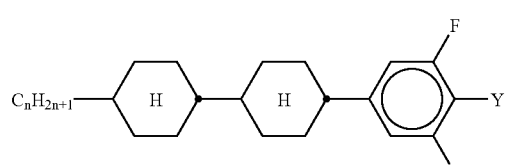

I1

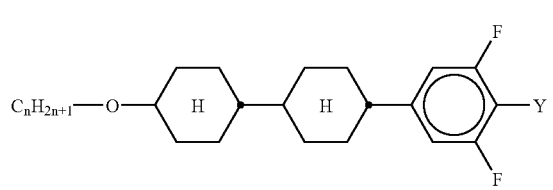

I2

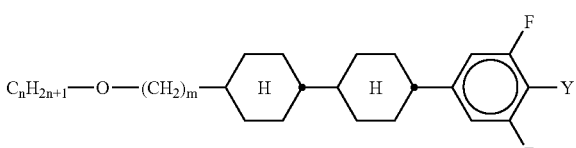

I3

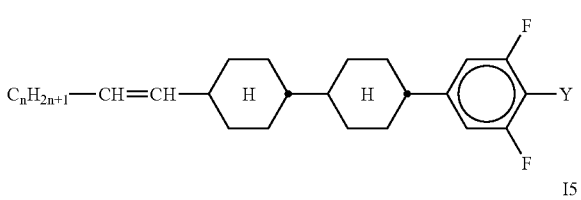

I4

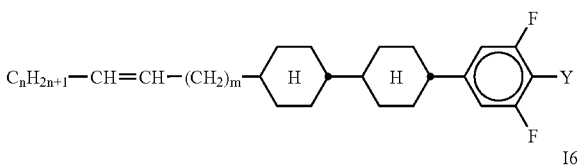

I5

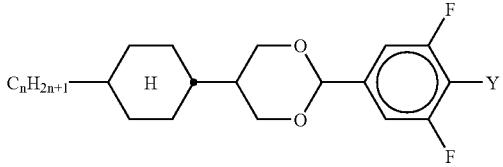

I6

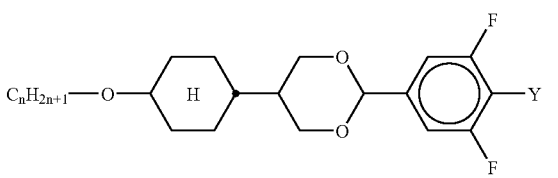

I7

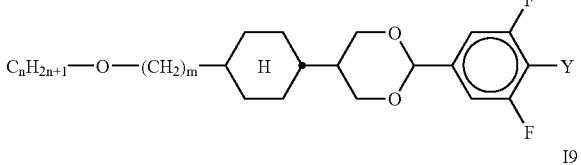

I8

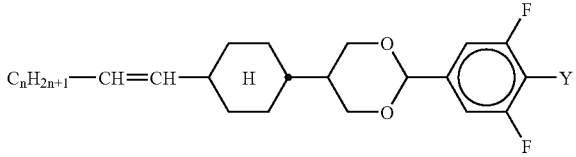

I9

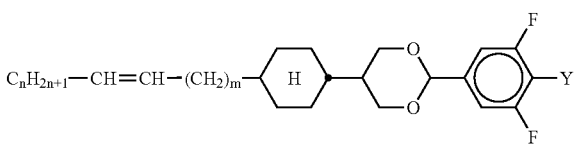

I10 in which n is 1–10 and m is 1–5, where m+n≦10.

Y in the compounds of the formula I is preferably F, furthermore $OCF_3$, and m is preferably 0, furthermore 1 or 2.

Particular preference is given to mixtures according to the invention which comprise at least one compound of the formulae I1 and/or I4, particularly preferably in each case at least one compound of the formula I1.

In the formulae I4, I9 and I10, the alkenyl radical is preferably 1E-alkenyl or 3E-alkenyl having from 2 to 7 carbon atoms.

The proportion of the compounds of the formula I in the mixtures is from 2.0 to 30% by weight, preferably from 5.0 to 25% by weight, in particular from 5.0 to 20% by weight.

The preferred compounds of the formula II include, in particular, the compounds in which $R^2$ is alkyl, alkoxy, 1E-alkenyl or 3E-alkenyl. $R^2$ is preferably methyl, ethyl, n-propyl, n-butyl, n-pentyl, n-hexyl, n-heptyl, vinyl or alkyl.

The proportion of the compounds of the formula II in the liquid-crystalline mixture is preferably 5–30% by weight, in particular 8–20% by weight.

The compounds of the formulae I1 to I10 and the compounds of the formula II having a dielectric anisotropy of >1.5 should be assigned to the above-defined component A.

The use of compounds of the formulae I and II in the liquid-crystal mixtures according to the invention results in particularly low values for the rotational viscosity and in TN and STN displays having high steepness and fast response times, in particular at low temperatures.

Besides one or more compounds of the formula I, component A preferably comprises one or more cyano compounds of the formulae IIIa to IIIj

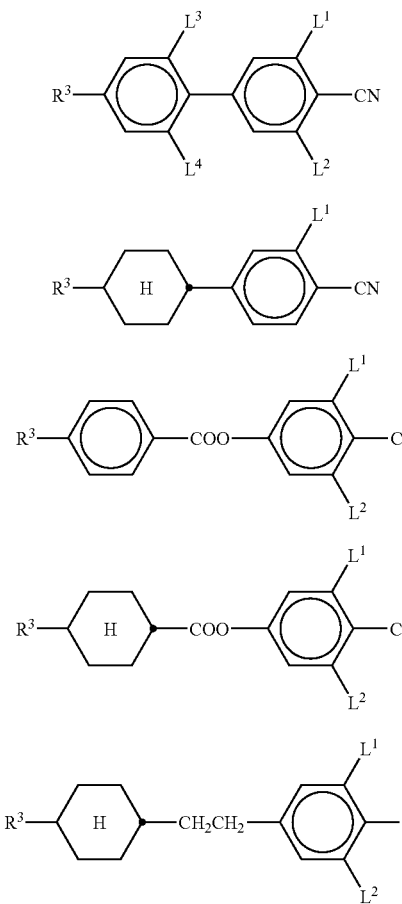
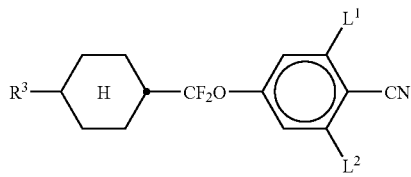
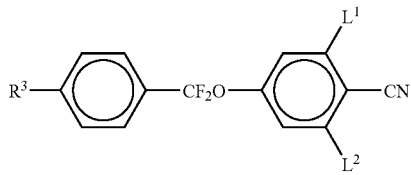
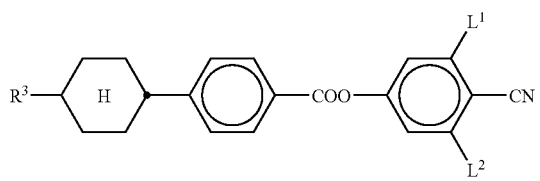
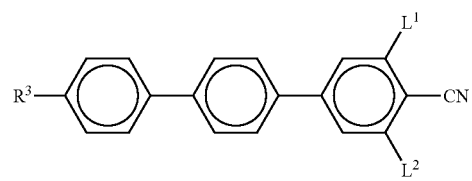
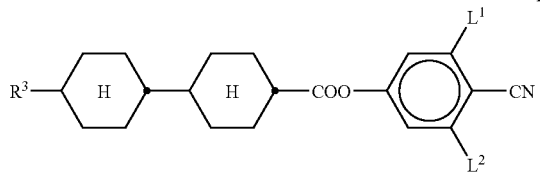

in which $R^3$ is as defined for $R^1$ in the formula I, and $L^1$ to $L^4$ are each, independently of one another, H or F. $R^3$ in these compounds is particularly preferably alkyl, alkenyl or alkoxy having up to 8 carbon atoms.

Particular preference is given to mixtures which comprise one or more compounds of the formulae IIIb, IIIc and IIIf, in particular those in which $L^1$ and/or $L^2$ are F. Particular preference is given to compounds of the formulae

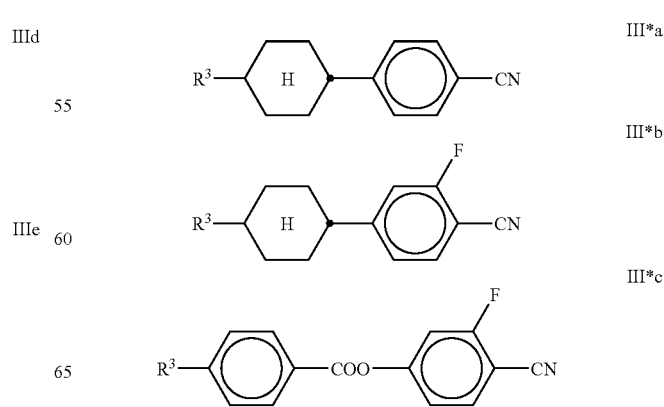

-continued

III*d
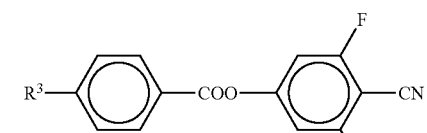

III*e
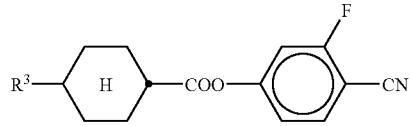

III*f
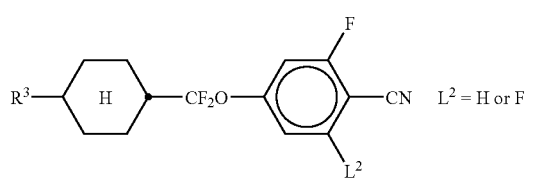
L² = H or F

III*g
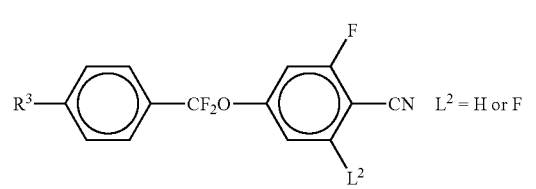
L² = H or F

III*h
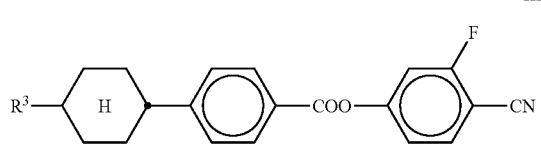

Preference is furthermore given to compounds of the formulae

III*i
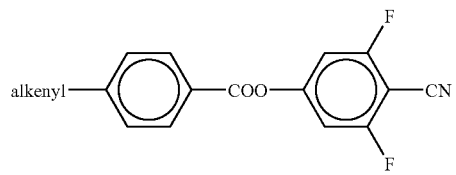

III*j
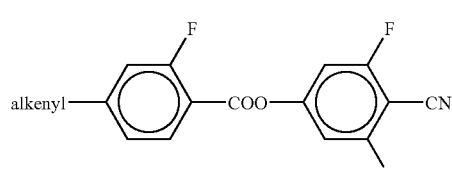

III*k
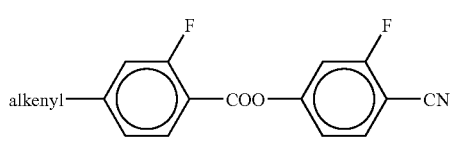

where alkenyl is preferably 1E- or 3E-alkenyl having up to 6 carbon atoms.

Particular preference is given here to the compounds of the formulae

III*l
III*m
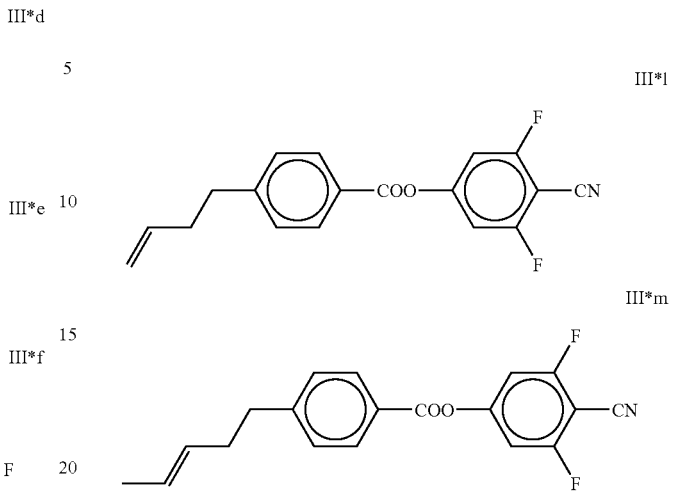

Besides one or more compounds of the formula I, component A preferably comprises one or more 3,4,5-trifluorophenyl compounds of the formulae I*A to I*H I*A
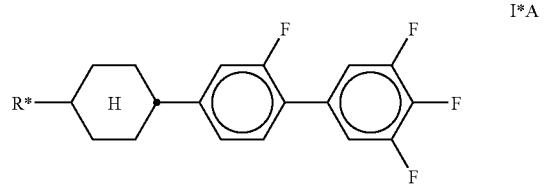

I*B
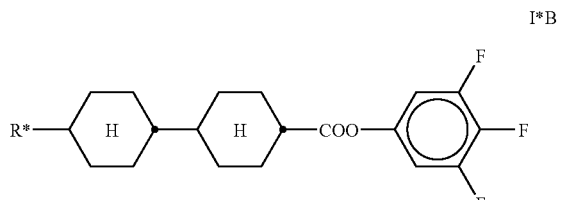

I*C
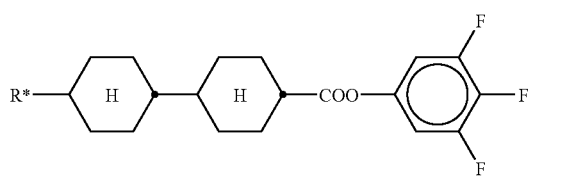

I*D
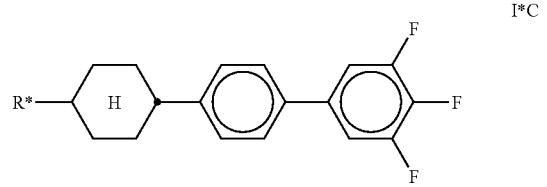

I*E
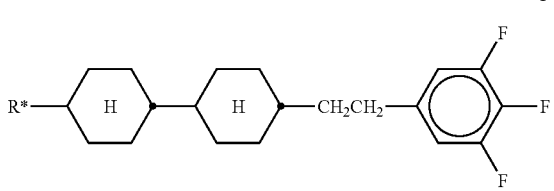

I*F
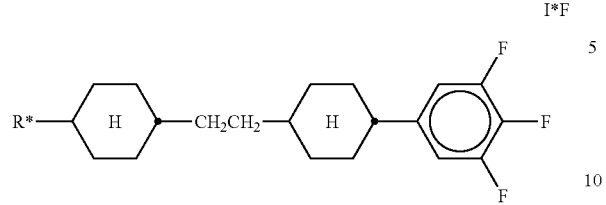
I*G
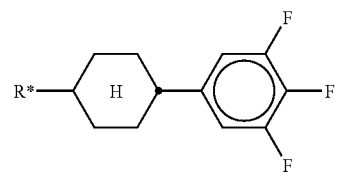
I*H
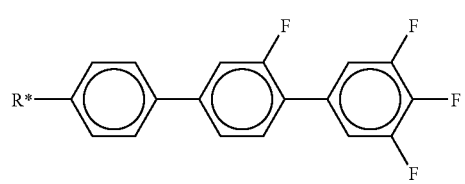
and, if desired, one or more compounds containing a polar end group, of the formulae IA to IP
I**A
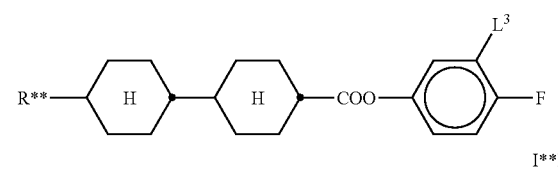
I**B
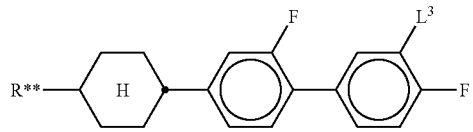
I**C
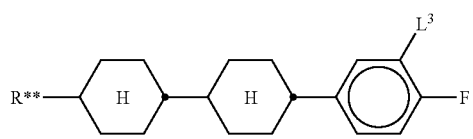
I**D
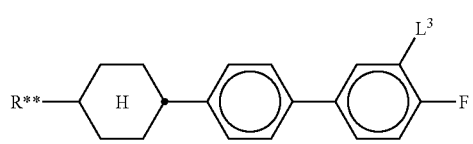
I**E
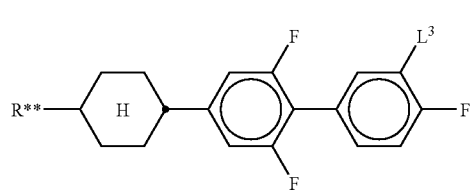
I**F
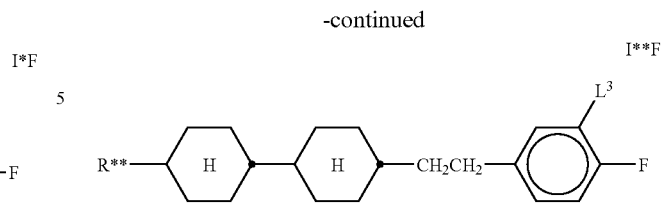
I**G
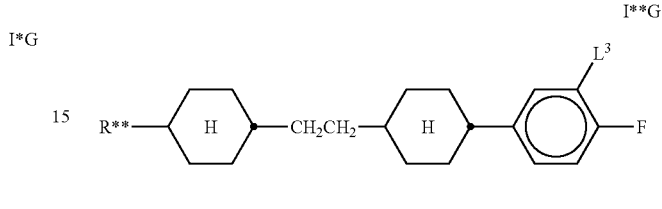
I**H
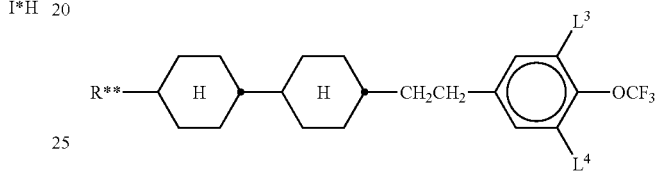
I**I
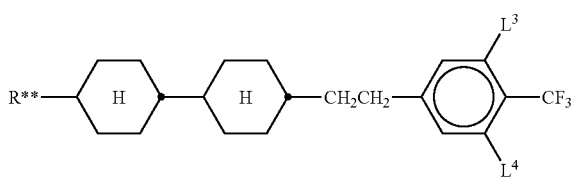
I**J
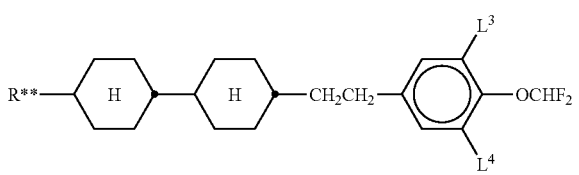
I**K
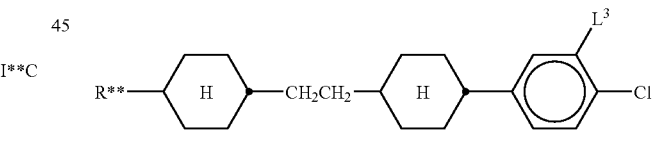
I**L
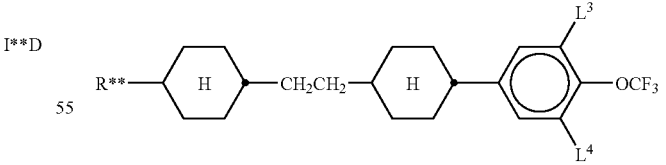
I**M
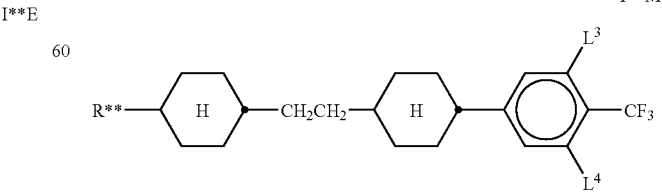

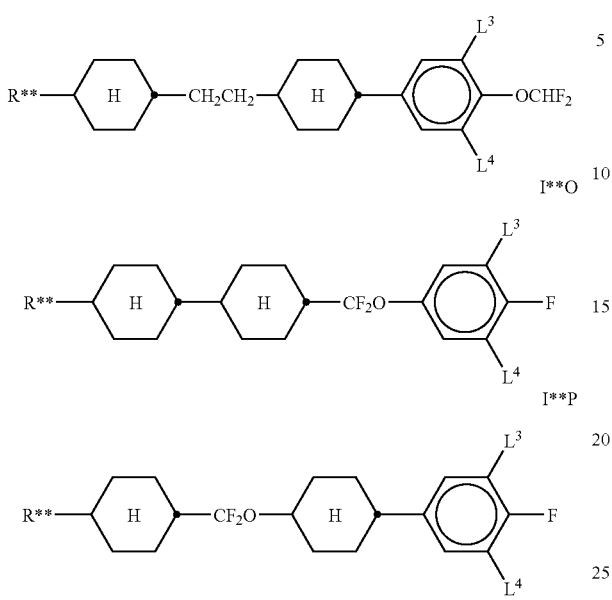

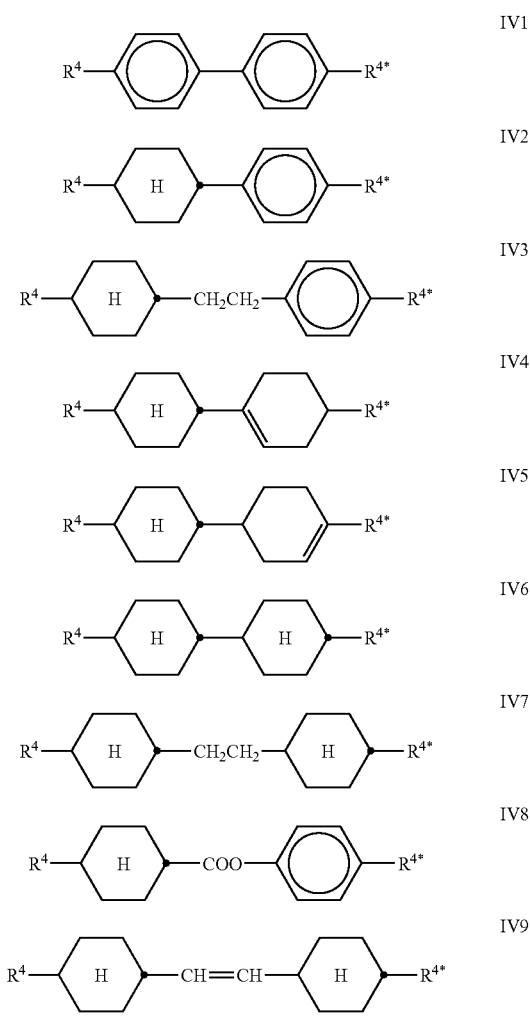

in which R* and R** are as defined for $R^1$ in the formula I, and $L^3$ and $L^4$ are each, independently of one another, H or F. R* and R** in these compounds are particularly preferably alkyl, alkenyl or alkoxy having up to 8 carbon atoms.

The individual compounds of the formulae I, I*A-I*H, IA to IP, II and III and their sub-formulae and also other compounds which can be used in the mixtures according to the invention are either known or can be prepared analogously to the known compounds.

The compounds of the formula I have low viscosities, in particular low rotational viscosities, and low values for the ratio of the elastic constants $K_{33}/K_{11}$, and therefore result in short response times in the displays according to the invention, whereas the presence of compounds of the formula II of high dielectric anisotropy, in particular in increased concentrations, causes a reduction in the threshold voltage.

Preferred liquid-crystal mixtures comprise one or more compounds of component A, preferably in a proportion of from 15% to 75%, particularly preferably from 20% to 65%. These compounds have a dielectric anisotropy ∆∈ of ^+3, in particular ∆∈^+8, particularly preferably ∆∈^+12.

Further preferred mixtures comprise
  one or more, in particular one or two to four, compounds of the formula I,
  one or two compounds of the formula II,
  one or more, in particular one or two, compounds of the formula II,
  one or more, in particular from two to five, compounds of the formulae IIIb and IIIc in which $L^1$ and $L^2$ are fluorine,
  no compound of the formula IIIb in which $L^1$ and $L^2$ are H.

Preferred liquid-crystal mixtures comprise one or more compounds of component B, preferably from 25 to 85%. The compounds from group B are distinguished, in particular, by their low values for the rotational viscosity $\gamma_1$.

Besides one or more compounds of the formula II, component B preferably comprises one or more compounds selected from the group consisting of the bicyclic compounds of the following formulae IV1 to IV9:

and/or one or more compounds selected from the group consisting of the tricyclic compounds of the formulae IV10 to IV29,

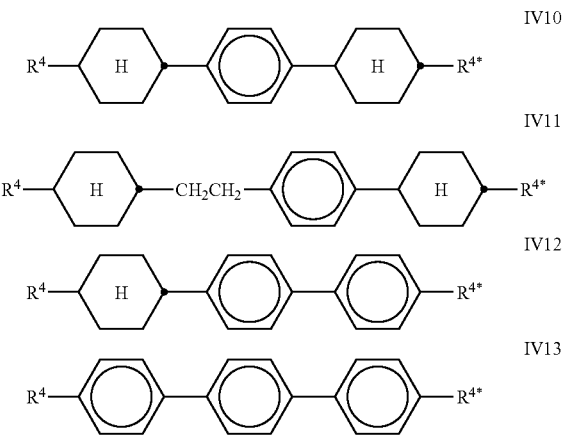

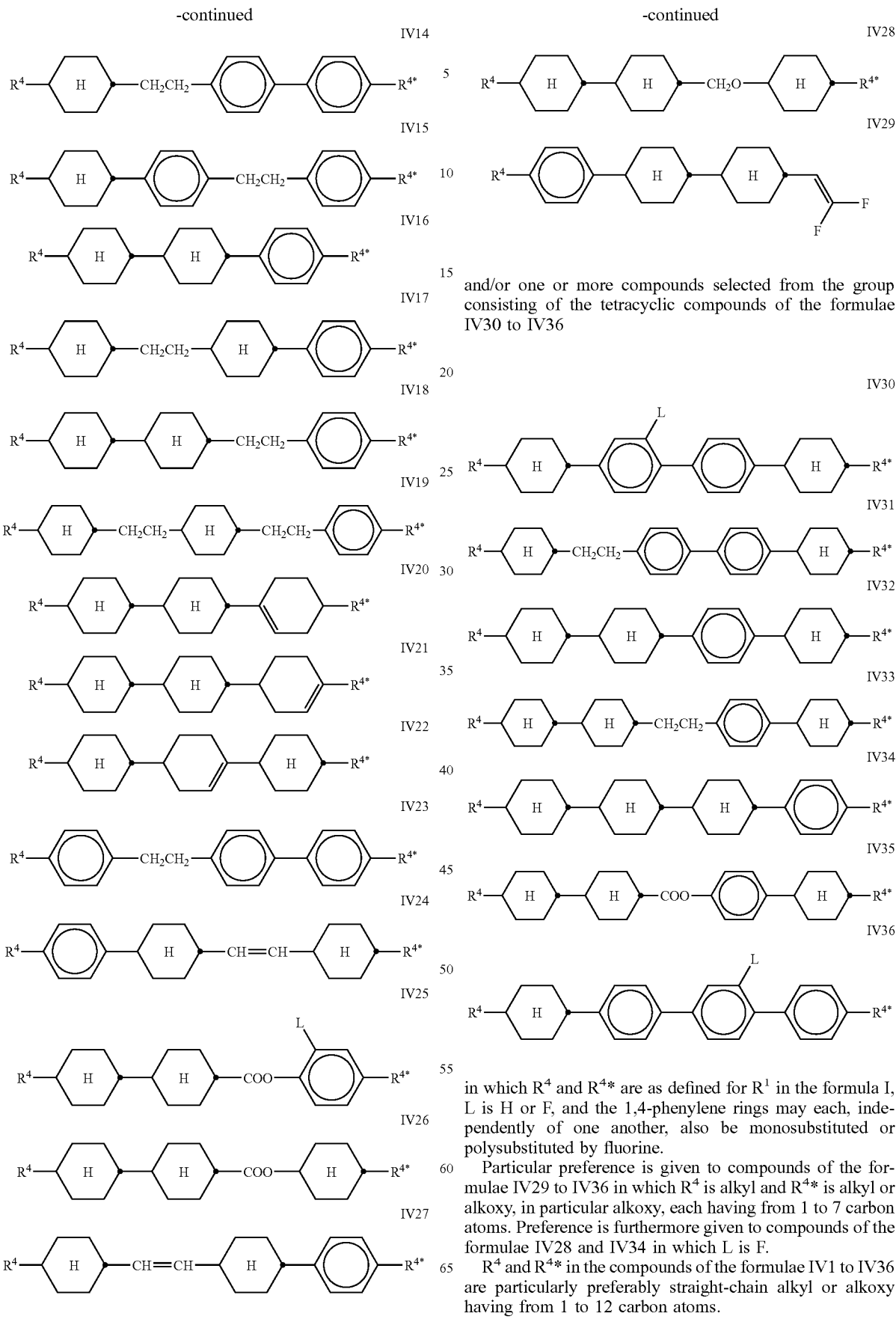

and/or one or more compounds selected from the group consisting of the tetracyclic compounds of the formulae IV30 to IV36 in which $R^4$ and $R^{4*}$ are as defined for $R^1$ in the formula I, L is H or F, and the 1,4-phenylene rings may each, independently of one another, also be monosubstituted or polysubstituted by fluorine.

Particular preference is given to compounds of the formulae IV29 to IV36 in which $R^4$ is alkyl and $R^{4*}$ is alkyl or alkoxy, in particular alkoxy, each having from 1 to 7 carbon atoms. Preference is furthermore given to compounds of the formulae IV28 and IV34 in which L is F.

$R^4$ and $R^{4*}$ in the compounds of the formulae IV1 to IV36 are particularly preferably straight-chain alkyl or alkoxy having from 1 to 12 carbon atoms.

Preferred liquid-crystal mixtures comprise one, two, three or four compounds of the formulae IV27 and/or IV28.

Preferred compounds of the formula IV27 are

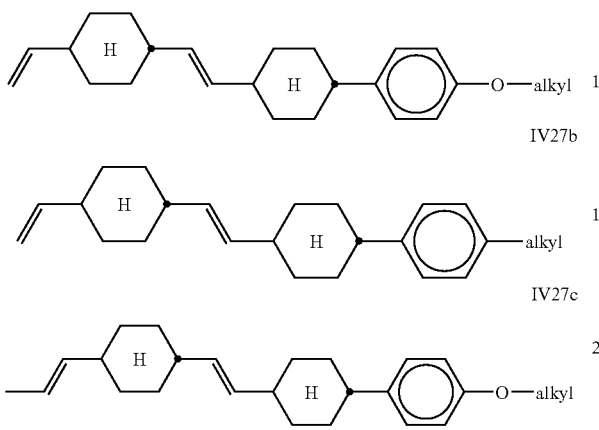

Particular preference is given to mixtures according to the invention which comprise at least one compound of the formula IV35, with the proportion of the tetracyclic compounds in the mixture preferably being at least 8% by weight. Particular preference is given to mixtures which comprise two, three or more homologues of the formula IV35. In the formula IV35, $R^4$ and $R^{4'}$ are preferably straight-chain alkyl.

Mixtures according to the invention preferably comprise at least one compound of the formulae IV27a, IV27b and/or IV27c. In particular, the mixtures comprise at least two compounds of the formulae IV27a to IV27c.

The liquid-crystalline mixtures optionally comprise an optically active component C in an amount such that the ratio between the layer thickness (separation of the outer plates) and the natural pitch of the chiral nematic liquid-crystal mixture is greater than 0.2. A multiplicity of chiral dopants, in some cases commercially available, are available to the person skilled in the art for the component, such as, for example, cholesteryl nonanoate (CN), S-811, S-1011 and S-2011 from Merck KGaA, Darmstadt, and CB15 (BDH, Poole, UK). The choice of the dopants is not crucial per se.

The proportion of the compounds of component C is preferably from 0 to 10%, in particular from 0 to 5%, particularly preferably from 0 to 3%.

The mixtures according to the invention may also optionally comprise up to 20% of one or more compounds having a dielectric anisotropy of less than −2 (component D).

If the mixtures comprise compounds of component D, these are preferably one or more compounds containing the structural unit 2,3-difluoro-1,4-phenylene, for example compounds as described in DE-A 38 07 801, 38 07 861, 38 07 863, 38 07 864 or 38 07 908. Particular preference is given to tolans containing this structural unit as described in the International Patent Application PCT/DE 88/00133.

Further known compounds of component D are, for example, derivatives of the 2,3-dicyanohydroquinones or cyclohexane derivatives containing the structural unit

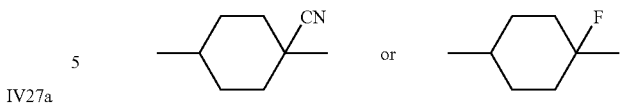

or as described in DE-A 32 31 707 and DE-A 34 07 013.

The liquid-crystal displays according to the invention preferably comprise no compounds of component D.

Further preferred embodiments relate to liquid-crystal mixtures according to the invention which additionally comprise one or more, particularly preferably one, two or three, heterocyclic compounds of the formulae Va and/or Vb

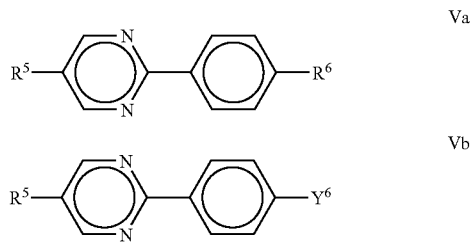

in which $R^5$ and $R^6$, independently of one another, are alkyl having from 1 to 7 carbon atoms, and $Y^6$ is F or Cl.

The proportion of the compounds from the group comprising Va and Vb is preferably from 2 to 35%, in particular from 5 to 20%.

additionally comprise one or more, particularly preferably one, two or three, tolan compounds of the formulae T1a to T1d and/or T2a to T2c

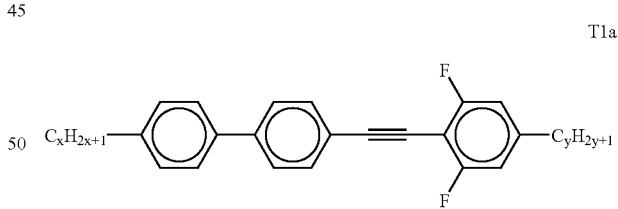

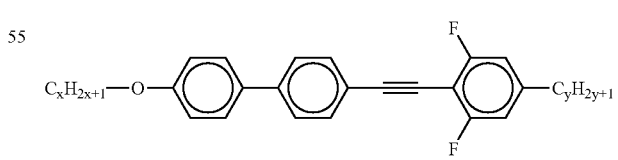

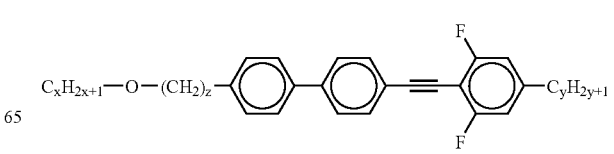

-continued

T1d

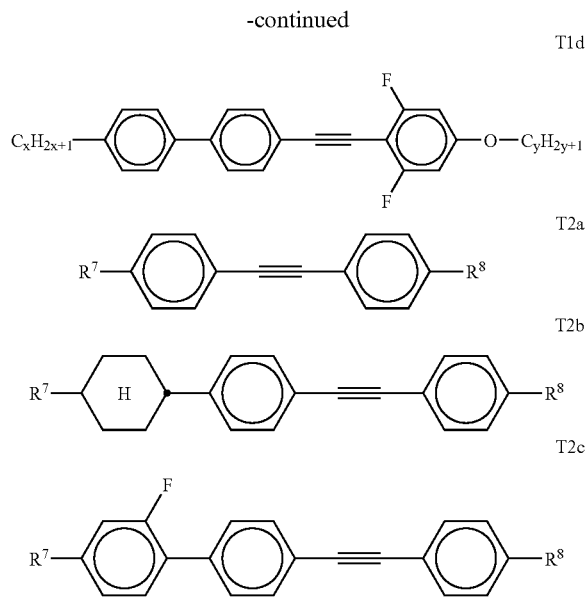

T2a

T2b

T2c in which $R^7$ and $R^8$, independently of one another, are as defined for $R^1$, and x and y are each from 1 to 10, where x+y is ≦10 and Z is 1–5.

The proportion of the compounds from the group consisting of T2a and T2b is preferably from 0 to 20%, in particular from 0 to 12%. The proportion of the compounds from the group consisting of T1a to T1d is preferably from 0 to 30%, in particular from 0 to 20%.

The term "alkenyl" in the definition of $R^1$, $R^2$, $R^4$, $R^{4*}$, $R^5$, $R^6$, $R^7$ and $R^8$ covers straight-chain and branched alkenyl groups, in particular the straight-chain groups. Particularly preferred alkenyl groups are $C_2$–$C_7$-1E-alkenyl, $C_4$–$C_7$-3E-alkenyl, $C_5$–$C_7$-4-alkenyl, $C_6$–$C_7$-5-alkenyl and $C_7$-6-alkenyl, in particular $C_2$–$C_7$-1E-alkenyl, $C_4$–$C_7$-3E-alkenyl and $C_5$–$C_7$-4-alkenyl.

Examples of preferred alkenyl groups are vinyl, 1E-propenyl, 1E-butenyl, 1E-pentenyl, 1E-hexenyl, 1E-heptenyl, 3-butenyl, 3E-pentenyl, 3E-hexenyl, 3E-heptenyl, 4-pentenyl, 4Z-hexenyl, 4E-hexenyl, 4Z-heptenyl, 5-hexenyl, 6-heptenyl and the like. Groups having up to 5 carbon atoms are generally preferred.

In particularly preferred embodiments, the mixtures comprise
one or more compounds of the following formulae:

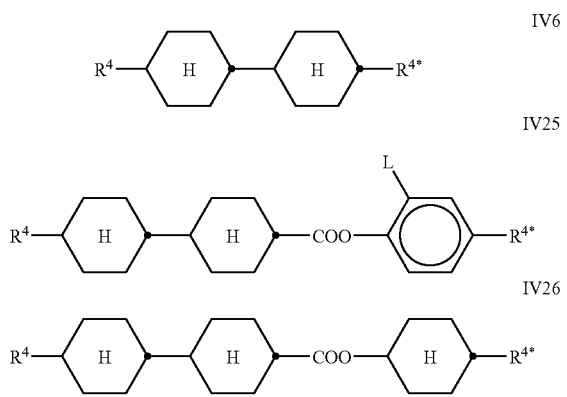

IV6

IV25

IV26

IV30 in which $R^4$, $R^{4*}$ and L are as defined above, and L in the formula IV25 is particularly preferably F. The proportion of these compounds in the liquid-crystal mixtures is preferably from 10 to 45%, in particular from 15 to 40%, at least two compounds of the formula IIIc, and optionally in addition at least one compound of the formula IIIb in which $L^1$ and $L^2$ are F. The proportion of these compounds in the liquid-crystal mixtures is preferably from 7 to 50%, in particular from 10 to 40%, at least one compound of the formulae VIa to VIe

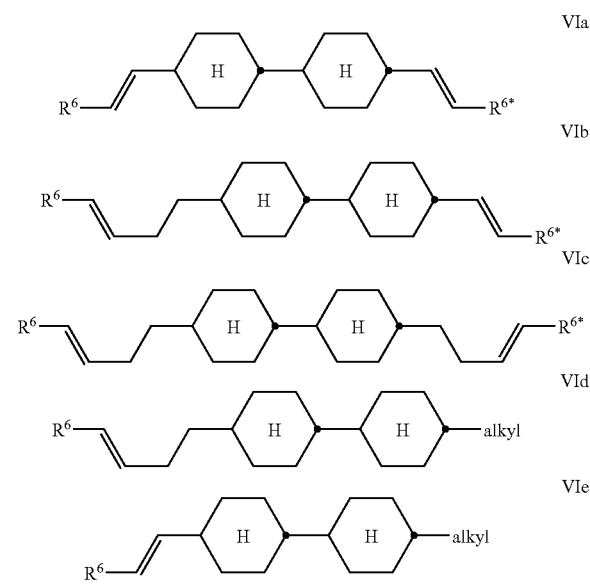

VIa

VIb

VIc

VId

VIe in which $R^6$ and $R^{6*}$ are each, independently of one another, H, $CH_3$, $C_2H_5$ or n-$C_3H_7$, and alkyl is a straight-chain alkyl group having from 1 to 7 carbon atoms, preferably n-propyl or n-pentyl, particularly preferably in each case at least one compound of the formulae VIa1 and/or VIb1

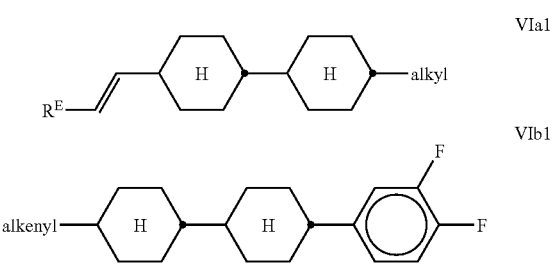

VIa1

VIb1 in which alkenyl is an alkenyl group having from 2 to 7 carbon atoms, alkyl is an alkyl group having from 1 to 7 carbon atoms, and $R^E$ is H, $CH_3$, $C_2H_5$ or n-$C_3H_7$.

The mixtures according to the invention are distinguished, in particular on use in TN and STN displays of high layer thicknesses, by very low total response times ($t_{tot}=t_{on}+t_{off}$).

The liquid-crystal mixtures used in the TN and STN cells according to the invention are dielectrically positive, with $\Delta\epsilon \char"5E 1$. Particular preference is given to liquid-crystal mixtures with $\Delta\epsilon \char"5E 3$, in particular with $\Delta\epsilon \char"5E 5$.

The liquid-crystal mixtures according to the invention have favourable values for the threshold voltage $V_{10/0/20}$ and for the rotational viscosity $\gamma_1$. If the value for the optical path difference $d\cdot\Delta n$ is pre-specified, the value for the layer thickness d is determined by the optical anisotropy $\Delta n$. In particular at relatively high values for $d\cdot\Delta n$, the use of liquid-crystal mixtures according to the invention having a relatively high value for the optical anisotropy is generally preferred, since the value for d can then be selected to be relatively small, which results in more favourable values for the response times. However, liquid-crystal displays according to the invention which contain liquid-crystal mixtures according to the invention with smaller values for $\Delta n$ are also characterised by advantageous values for the response times.

The liquid-crystal mixtures according to the invention are furthermore characterised by advantageous values for the steepness of the electro-optical characteristic line, and can be operated with high multiplex rates, in particular at temperatures above 20° C. In addition, the liquid-crystal mixtures according to the invention have high stability and favourable values for the electrical resistance and the frequency dependence of the threshold voltage. The liquid-crystal displays according to the invention have a large working-temperature range and good angle dependence of the contrast.

The construction of the liquid-crystal display elements according to the invention from polarisers, electrode base plates and electrodes having a surface treatment such that the preferential alignment (director) of the liquid-crystal molecules in each case adjacent thereto is usually twisted by a value of from 160° to 720° from one electrode to the other corresponds to the usual structure for display elements of this type. The term "usual structure" here is broadly drawn and also covers all derivatives and modifications of the TN and STN cell, in particular also matrix display elements and display elements containing additional magnets.

The surface tilt angle at the two outer plates may be identical or different. Identical tilt angles are preferred. Preferred TN displays have pre-tilt angles between the longitudinal axis of the molecules at the surface of the outer plates and the outer plates of from 0° to 7°, preferably from 0.01° to 5°, in particular from 0.1 to 2°. In the STN displays, the pre-tilt angle is from 1° to 30°, preferably from 1° to 12° and in particular from 3° to 10°.

The twist angle of the TN mixture in the cell has a value of between 22.5° and 170°, preferably between 45° and 130° and in particular between 80° and 115°. The twist angle of the STN mixture in the cell from alignment layer to alignment layer has a value of between 100° and 600°, preferably between 170° and 300° and in particular between 180° and 270°.

The liquid-crystal mixtures which can be used in accordance with the invention are prepared in a manner which is conventional per se. In general, the desired amount of the components used in lesser amount are dissolved in the components making up the principal constituent, practically at elevated temperature. It is also possible to mix solutions of the components in an organic solvent, for example in acetone, chloroform or methanol, and to remove the solvent again, for example by distillation, after thorough mixing.

The dielectrics may also comprise further additives which are known to the person skilled in the art and are described in the literature. For example, 0–15% of pleochroic dyes may be added.

In the present application and in the examples below, the structures of the liquid-crystal compounds are indicated by means of acronyms, the transformation into chemical formulae taking place in accordance with Tables A and B. All radicals $C_nH_{2n+1}$, and $C_mH_{2m+1}$ are straight-chain alkyl radicals having n and m carbon atoms respectively. The alkenyl radicals have the trans-configuration. The coding in Table B is self-evident. In Table A, only the acronym for the parent structure is indicated. In individual cases, the acronym for the parent structure is followed, separated by a dash, by the code indicated in the table below for the substituents $R^1$, $R^2$, $L^1$, $L^2$ and $L^3$.

| Code for $R^1$, $R^2$, $L^1$, $L^2$, $L^3$ | $R^1$ | $R^2$ | $L^1$ | $L^2$ | $L^3$ |
|---|---|---|---|---|---|
| nm | $C_nH_{2n+1}$ | $C_mH_{2m+1}$ | H | H | H |
| nOm | $OC_nH_{2n+1}$ | $C_mH_{2m+1}$ | H | H | H |
| nO.m | $C_nH_{2n+1}$ | $OC_mH_{2m+1}$ | H | H | H |
| n | $C_nH_{2n+1}$ | CN | H | H | H |
| nN.F | $C_nH_{2n+1}$ | CN | H | H | F |
| nN.F.F | $C_nH_{2n+1}$ | CN | H | F | F |
| nF | $C_nH_{2n+1}$ | F | H | H | H |
| nOF | $OC_nH_{2n+1}$ | F | H | H | H |
| nF.F | $C_nH_{2n+1}$ | F | H | H | F |
| nmF | $C_nH_{2n+1}$ | $C_mH_{2m+1}$ | F | H | H |
| nOCF$_3$ | $C_nH_{2n+1}$ | OCF$_3$ | H | H | H |
| n-Vm | $C_nH_{2n+1}$ | —CH~CH—$C_mH_{2m+1}$ | H | H | H |
| nV-Vm | $C_nH_{2n+1}$—CH~CH— | —CH~CH—$C_mH_{2m+1}$ | H | H | H |

The TN and STN displays preferably contain liquid-crystalline mixtures which are composed of one or more compounds from Tables A and B.

TABLE A

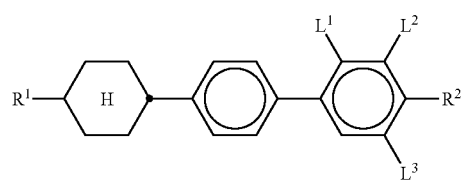

BCH

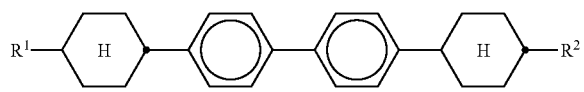

CBC

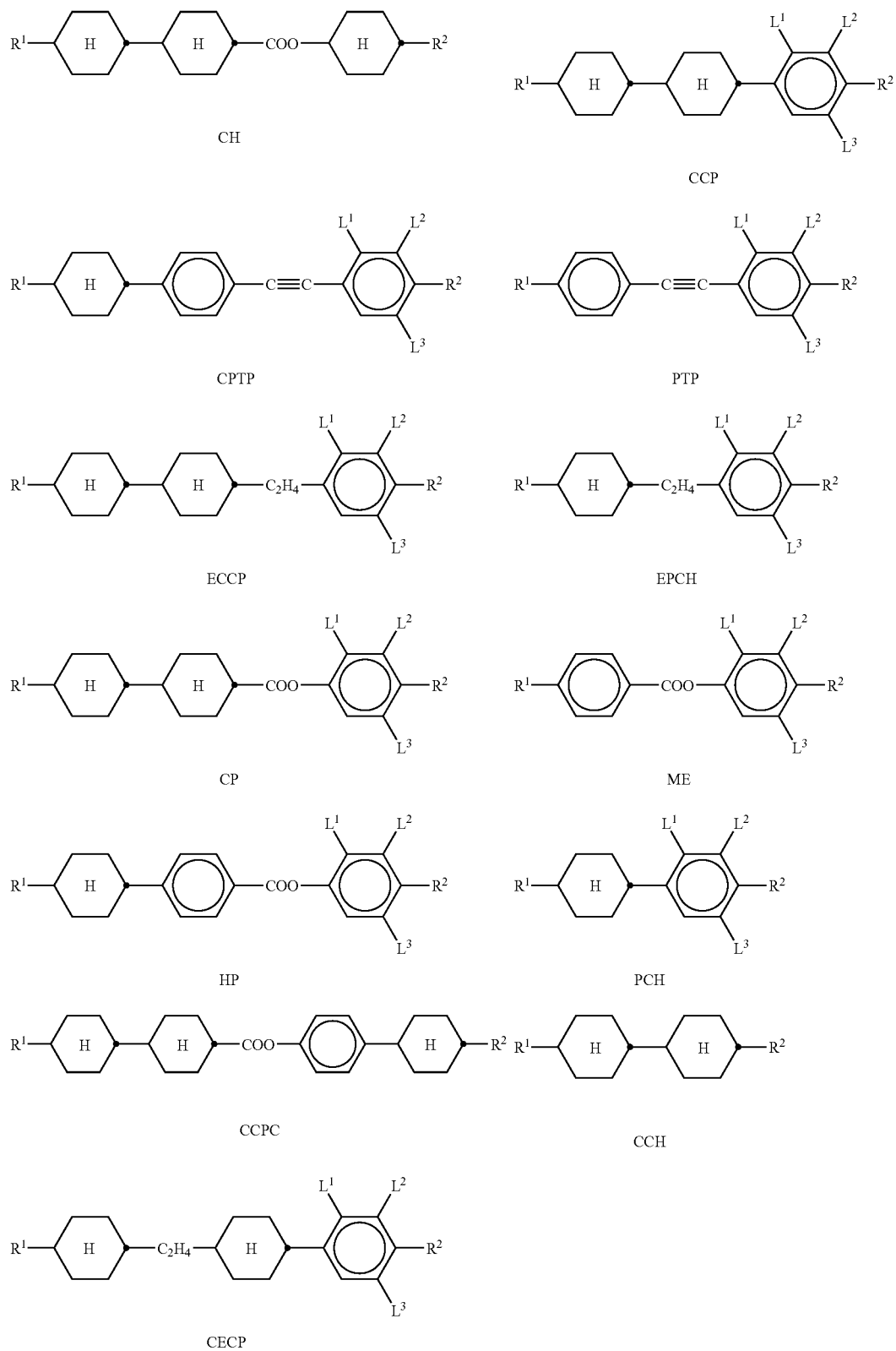
TABLE A-continued
($L^1$, $L^2$, $L^3$ = H or F)

TABLE B
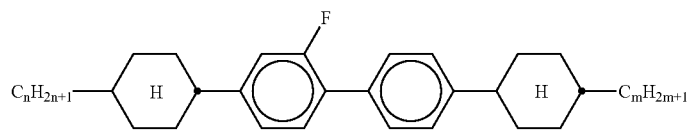
CBC-nmF
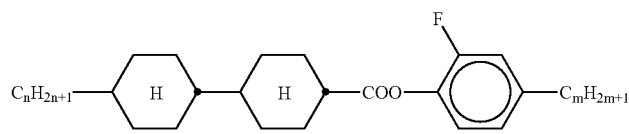
CP-nmF
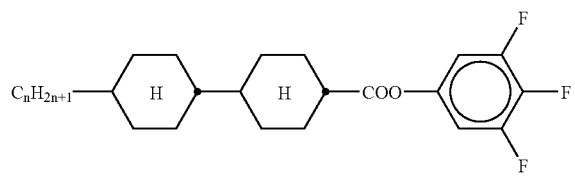
CCZU-n-F
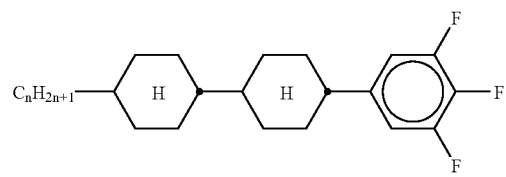
CCP-nF.F.F
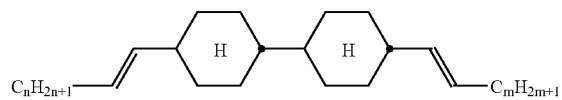
CC-nV-Vm
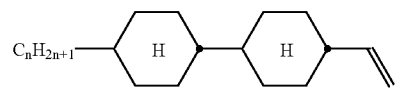
CC-n-V
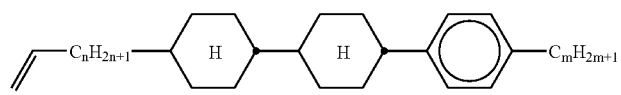
CCP-Vn-m
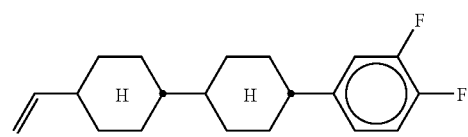
CCG-V-F
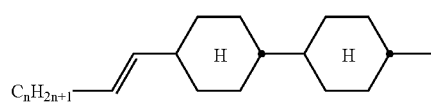
CCP-nV-m
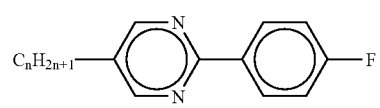
PYP-nF
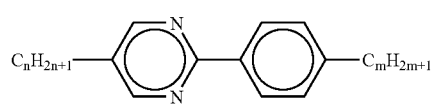
PYP-nm
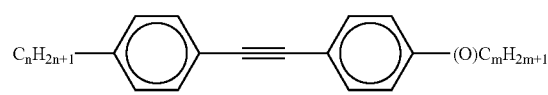
PTP-n(O)m TABLE B-continued
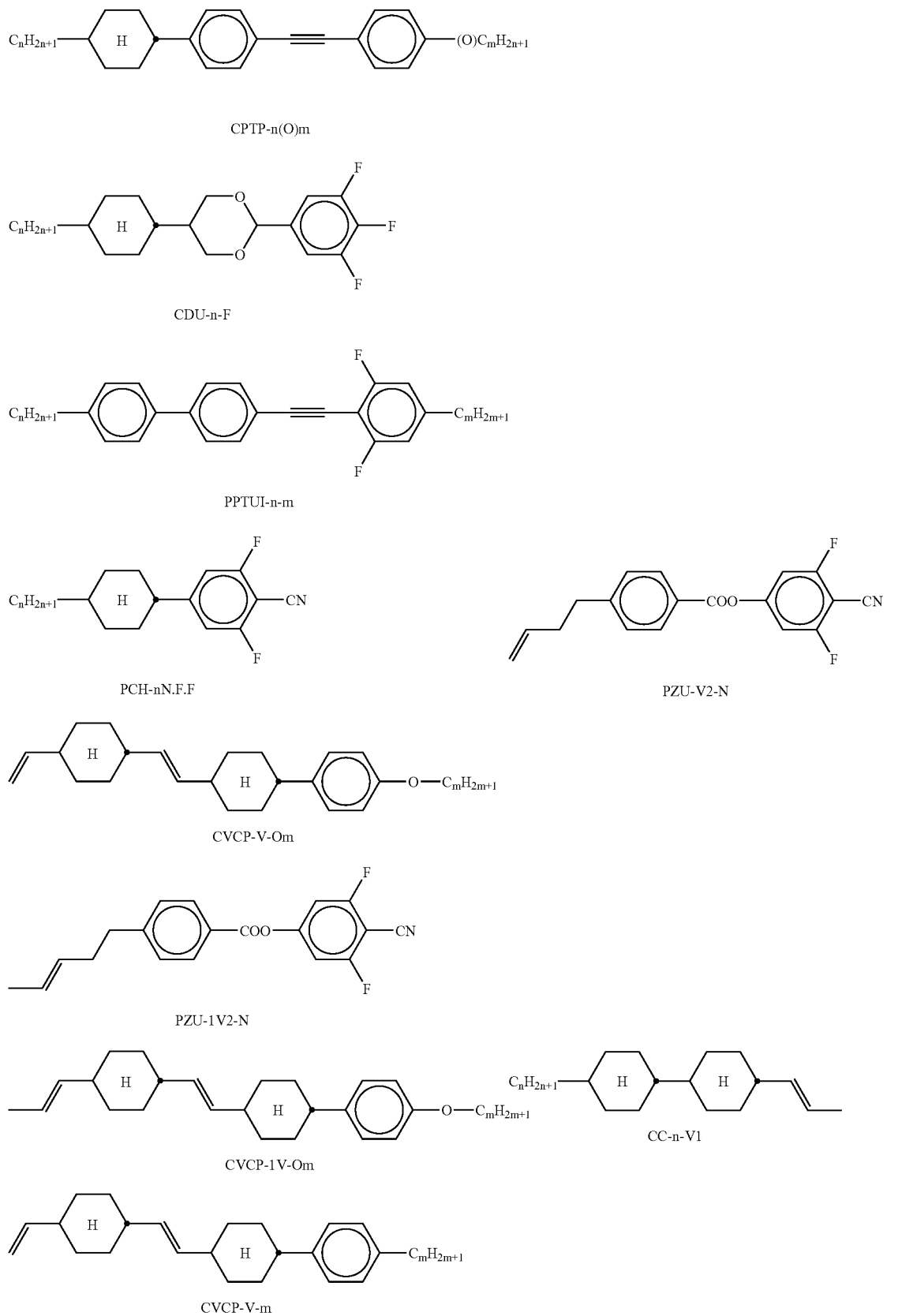

TABLE B-continued
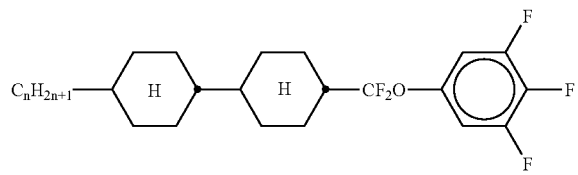
CCQU-n-F
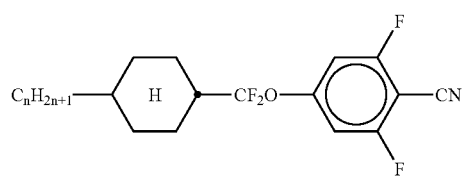
CQU-n-N
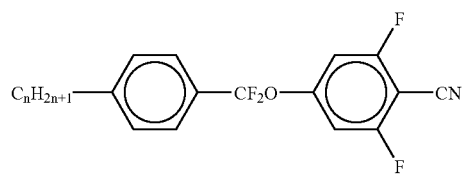
PQU-n-N
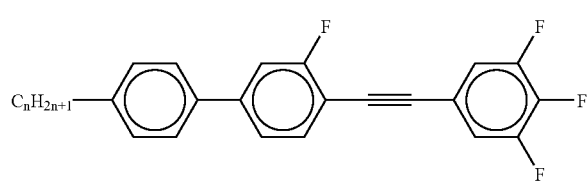
GPTU-n-F

TABLE C
Table C indicates possible dopants which are generally added to the mixtures according to the invention.
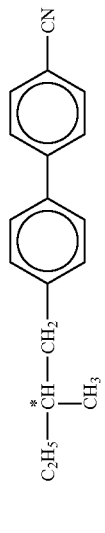

TABLE C-continued
Table C indicates possible dopants which are generally added to the mixtures according to the invention.
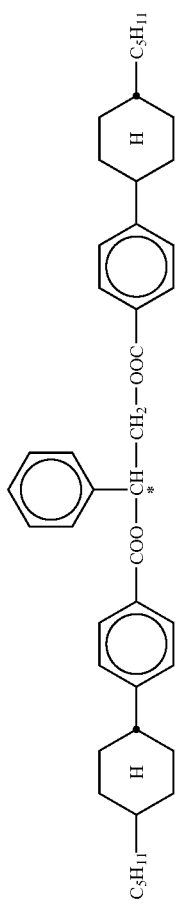
R/S-1011
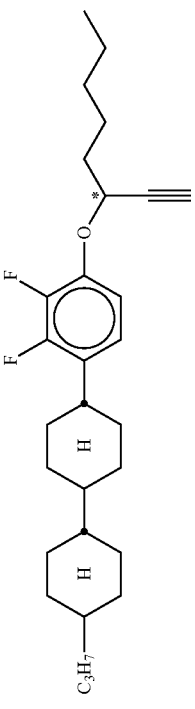
R/S-3011
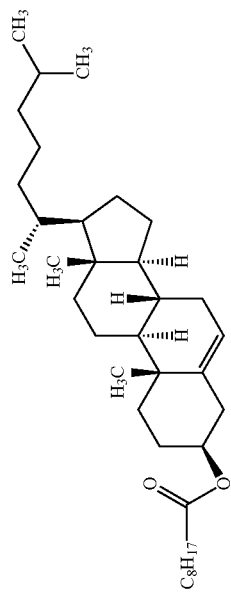
CN
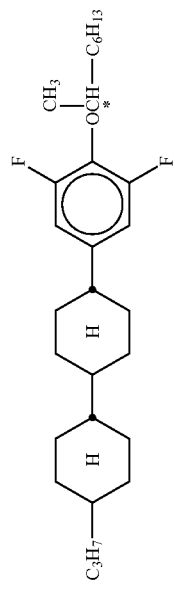
R/S-2011

The following examples are intended to illustrate the invention without representing a limitation. The following abbreviations are used:

cl.p. clearing point (nematic-isotropic phase transition temperature),
S—N smectic-nematic phase transition temperature,
viso. flow viscosity (mm$^2$/s, at 20° C. unless stated otherwise),
$\Delta n$ optical anisotropy (589 nm, 20° C.)
$\Delta \epsilon$ dielectric anisotropy (1 kHz, 20° C.)
steep characteristic line steepness=$(V_{90}/V_{10}-1) \cdot 100$ [%]
$V_{10}$ threshold voltage=characteristic voltage at a relative contrast of 10%,
$V_{90}$ characteristic voltage at a relative contrast of 90%,
$t_{ave}$ $$\frac{t_{on} + t_{off}}{2}$$

(mean response time)

$t_{on}$ time from switching on until 90% of the maximum contrast is reached,
$t_{off}$ time from switching off until 10% of the maximum contrast is reached,
mux multiplex rate
$t_{store}$ low-temperature storage stability in hours (−20° C., −30° C., −40° C.)

Above and below, all temperatures are given in ° C. The percentages are per cent by weight. All values relate to 20° C., unless stated otherwise. The displays are addressed, unless stated otherwise, with no multiplexing. The twist is 240°, unless stated otherwise.

EXAMPLES

Example 1 (HTN)

| | | | |
|---|---|---|---|
| PCH-3N.F.F | 12.5% | Clearing point [° C.]: | 68.0 |
| ME2N.F | 5.0% | $\Delta n$ [589 nm; 20° C.]: | 0.1036 |
| ME3N.F | 5.0% | d · $\Delta n$ [µm]: | 0.5 |
| ME4N.F | 10.0% | Twist [°]: | 90 |
| ME5N.F | 14.0% | $V_{10}$ [V]: | 0.68 |
| CCP-2F.F.F | 10.0% | $V_{50}$ [V]: | 0.85 |
| CCP-3F.F.F | 10.0% | $V_{90}$ [V]: | 1.10 |
| CCP-5F.F.F | 6.0% | $V_{90/10}$: | 1.618 |
| CCG-V-F | 4.0% | | |
| CH-45 | 3.5% | | |
| CH-33 | 3.0% | | |
| CH-35 | 3.0% | | |
| CCPC-33 | 3.0% | | |
| CCPC-34 | 3.0% | | |
| CCPC-35 | 4.0% | | |
| CC-5-V | 4.0% | | |

Example 2 (STN)

| | | | |
|---|---|---|---|
| PCH-3N.F.F | 11.0% | Clearing point [° C.]: | 79.0 |
| ME2N.F | 10.0% | $\Delta n$ [589 nm; 20° C.]: | 0.1292 |
| ME3N.F | 10.0% | d · $\Delta n$ [µm]: | 0.85 |
| ME4N.F | 10.0% | Twist [°]: | 240 |
| ME5N.F | 9.0% | $V_{10}$ [V]: | 0.68 |
| HP-3N.F | 5.0% | $V_{50}$ [V]: | 0.84 |
| HP-4N.F | 4.0% | $V_{90}$ [V]: | 0.87 |
| HP-5N.F | 4.0% | $V_{90/10}$: | 1.084 |
| CCP-2F.F.F | 8.0% | | |
| CCP-3F.F.F | 8.0% | | |
| CCP-5F.F.F | 8.0% | | |
| CCPC-33 | 5.0% | | |
| CCPC-34 | 4.0% | | |
| CCPC-35 | 4.0% | | |

Example 3 (STN)

| | | | |
|---|---|---|---|
| PCH-3N.F.F | 8.5% | Clearing point [° C.]: | 80.0 |
| ME2N.F | 10.0% | $\Delta n$ [589 nm; 20° C.]: | 0.1328 |
| ME3N.F | 10.0% | d · $\Delta n$ [µm]: | 0.85 |
| ME4N.F | 11.0% | Twist [°]: | 240 |
| ME5N.F | 10.5% | $V_{10}$ [V]: | 0.80 |
| HP-3N.F | 5.0% | $V_{50}$ [V]: | 0.83 |
| HP-4N.F | 5.0% | $V_{90}$ [V]: | 0.86 |
| CCP-2F.F.F | 8.0% | $V_{90/10}$: | 1.072 |
| CCP-3F.F.F | 8.0% | | |
| CCP-5F.F.F | 8.0% | | |
| CCPC-33 | 4.0% | | |
| CCPC-34 | 4.0% | | |
| CCPC-35 | 4.0% | | |

Example 4 (HTN)

| | | | |
|---|---|---|---|
| PCH-3N.F.F | 11.0% | Clearing point [° C.]: | 73.5 |
| ME2N.F | 5.0% | $\Delta n$ [589 nm; 20° C.]: | 0.1052 |
| ME3N.F | 5.0% | | |
| ME4N.F | 10.0% | | |
| ME5N.F | 14.0% | | |
| CCP-2F.F.F | 10.0% | | |
| CCP-3F.F.F | 10.0% | | |
| CCP-5F.F.F | 6.0% | | |
| CCG-V-F | 4.0% | | |
| CH-45 | 4.0% | | |
| CH-33 | 3.0% | | |
| CH-35 | 3.0% | | |
| CCPC-33 | 3.0% | | |
| CCPC-34 | 4.0% | | |
| CCPC-35 | 4.0% | | |
| CC-5-V | 4.0% | | |

Example 5

| | | | |
|---|---|---|---|
| ME2N.F | 10.00% | Clearing point [° C.]: | 111.0 |
| ME3N.F | 10.00% | $\Delta n$ [589 nm; 20° C.]: | 0.1312 |
| ME4N.F | 10.00% | HTP [20° C.]: | 12.39 |
| ME5N.F | 10.00% | d · $\Delta n$ [µm]: | 0.85 |
| CH-33 | 3.00% | Twist [°]: | 240 |
| CH-35 | 2.00% | $V_{10}$ [V]: | 1.12 |
| CP-1V-N | 3.00% | | |
| CCP-2F.F.F | 8.00% | | |
| CCP-3F.F.F | 10.00% | | |
| CCP-5F.F.F | 6.00% | | |
| CVCP-V-O1 | 3.00% | | |
| CVCP-1V-O1 | 4.00% | | |
| CCPC-33 | 5.00% | | |
| CCPC-34 | 5.00% | | |

-continued

| | |
|---|---|
| CCPC-35 | 5.00% |
| CBC-33F | 3.00% |

Example 6

| | | | |
|---|---|---|---|
| PCH-3N.F.F | 5.00% | Clearing point [° C.]: | 83.0 |
| ME2N.F | 10.00% | Δn [589 nm; 20° C.]: | 0.1422 |
| ME3N.F | 10.00% | HTP [20° C.]: | 14.45 |
| ME4N.F | 14.00% | d · Δn [μm]: | 0.85 |
| ME5N.F | 14.00% | Twist [°]: | 240 |
| HP-3N.F | 6.00% | $V_{10}$ [V]: | 0.79 |
| HP-4N.F | 5.00% | | |
| HP-5N.F | 5.00% | | |
| CCP-2F.F.F | 7.00% | | |
| CCP-3F.F.F | 6.00% | | |
| CCP-5F.F.F | 6.00% | | |
| CCPC-33 | 4.00% | | |
| CCPC-34 | 4.00% | | |
| CCPC-35 | 4.00% | | |

The invention claimed is:

1. A TN or STN liquid-crystal display comprising
two outer plates, which, together with a frame, form a cell,
a nematic liquid-crystal mixture of positive dielectric anisotropy located in the cell,
electrode layers with alignment layers on the insides of the outer plates,
a tilt angle between the longitudinal axis of the molecules at the surface of the outer plates and the outer plates of 0 degree to 30 degrees, and
a twist angle of the liquid-crystal mixture in the cell from alignment layer to alignment layer with a value of between 22.5° and 600°,
a nematic liquid-crystal mixture comprising
a) 15–75% by weight of a liquid-crystalline component A consisting of three or more compounds having a dielectric anisotropy of greater than +1.5;
b) 25–85% by weight of a liquid-crystalline component B consisting of one or more compounds having a dielectric anisotropy of between −1.5 and +1.5;
c) 0–20% by weight of a liquid-crystalline component D consisting of one or more compounds having a dielectric anisotropy of below −1.5, and
d) optionally, an optically active component C in such an amount that the ratio between the layer thickness (separation of the outer plates) and the natural pitch of the chiral nematic liquid-crystal mixture is about 0.2 to 1.3,
wherein component A of the liquid-crystal mixture comprises a nematic liquid-crystal mixture comprising:
a) one or more compounds of formula I

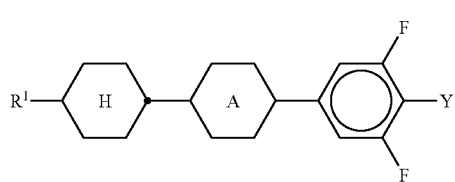

and
b) one or more compounds of formula II

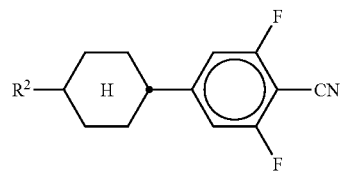

in which

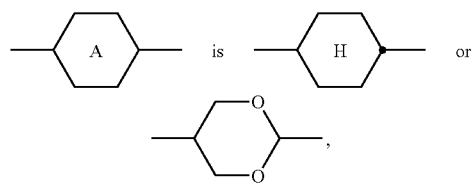

$R^1$ and $R^2$ are, each independently, an alkyl or alkenyl radical having up to 15 carbon atoms which is unsubstituted, monosubstituted by CN or $CF_3$ or at least monosubstituted by halogen, in which one or more $CH_9$ groups are, each independently of each other, optionally replaced by —O—, —S—, —C≡C—, —OC—O— or —O—CO— in such a way that O atoms are not linked directly to one another, Y is F, Cl or a halogenated alkyl, alkenyl or alkoxv radical having 1 to 6 carbon atoms, and c) one or more compounds of formulae IIIc to IIIj

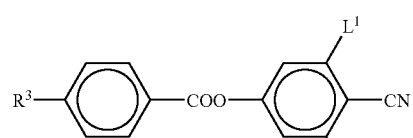

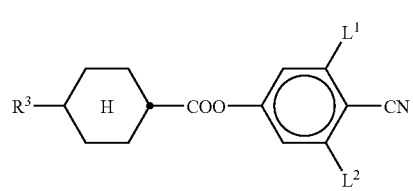

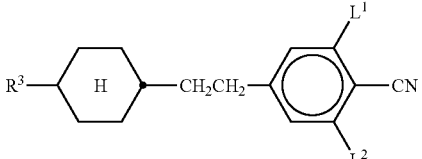

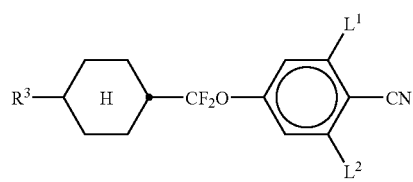

-continued

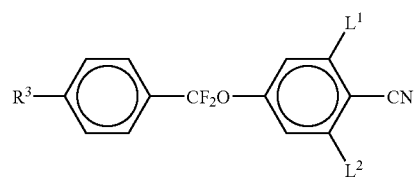
IIIg

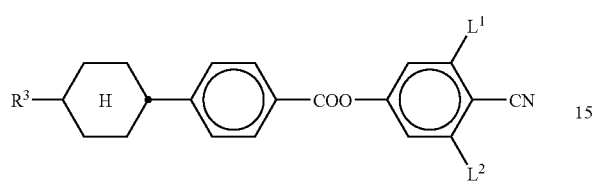
IIIh

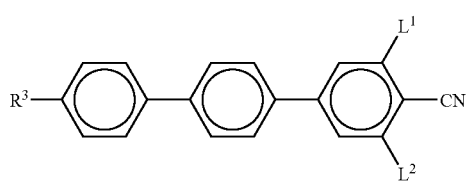
IIIi

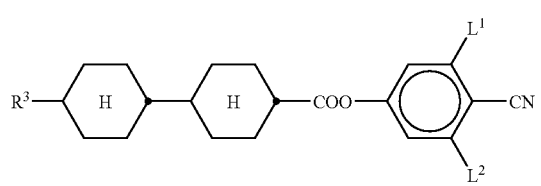
IIIj in which
R³ is an alkyl or alkenyl radical having up to 15 carbon atoms which is unsubstituted, monosubstituted by CN or CF₃ or at least monosubstituted by halogen, in which one or more CH₂ groups are, each independently of each other, optionally replaced by —O—, —S—, —C≡C—, —OC—O— or —O—CO— in such a way that O atoms are not linked directly to one another, and
$L^{1-4}$ are each, independently of one another, H or F.

2. A TN or STN liquid-crystal display according to claim 1, wherein component A comprises a compound of formula IIIc.

3. A TN or STN liquid-crystal display according to claim 1, wherein component A comprises a compound of formula IIId.

4. A TN or STN liquid-crystal display according to claim 1, wherein component A comprises a compound of formula IIIe.

5. A TN or STN liquid-crystal display according to claim 1, wherein component A comprises a compound of formula IIIf.

6. A TN or STN liquid-crystal display according to claim 1, wherein component A comprises a compound of formula IIIg.

7. A TN or STN liquid-crystal display according to claim 1, wherein component A comprises a compound of formula IIIh.

8. A TN or STN liquid-crystal display according to claim 1, wherein component A comprises a compound of formula IIIi.

9. A TN or STN liquid-crystal display according to claim 1, wherein component A comprises a compound of formula IIIj.

10. A TN or STN liquid-crystal display according to claim 6 wherein Y is fluorine.

11. A TN or STN liquid-crystal display according to claim 1, wherein component A further comprises one or more compounds of formulae III a to IIIb

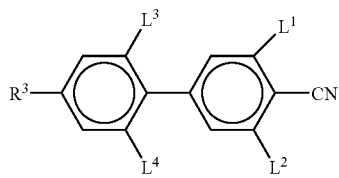
IIIa

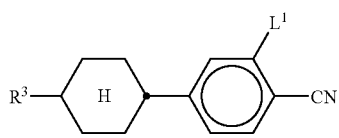
IIIb in which
R³ is an alkyl or alkenyl radical having up to 15 carbon atoms which is unsubstituted, monosubstituted by CN or CF₃ or at least monosubstituted by halogen, in which one or more CH₂ groups are, each independently of each other, optionally replaced by —O—, —S—, —C≡C—, —OC—O— or —O—CO— in such a way that O atoms are not linked directly to one another, and
$L^{1-4}$ are each, independently of one another, H or F.

12. A TN or STN liquid-crystal display according to claim 1, wherein component A further comprises one or more compounds of formulae III*i to III*k

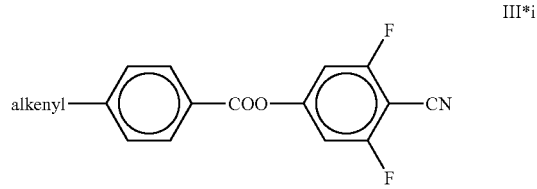
III*i

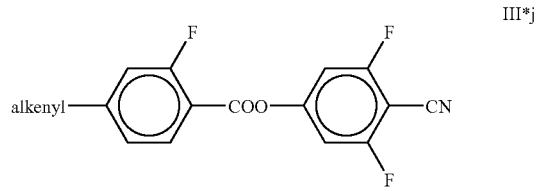
III*j

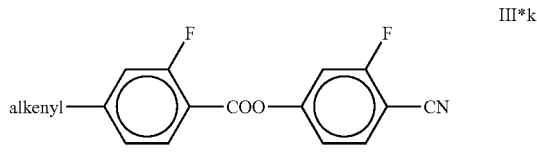
III*k in which alkenyl is 1E- or 3E-alkenyl.

13. A TN or STN liquid-crystal display according to claim 1, wherein component A further comprises one or more compounds of formulae VIa to VIe

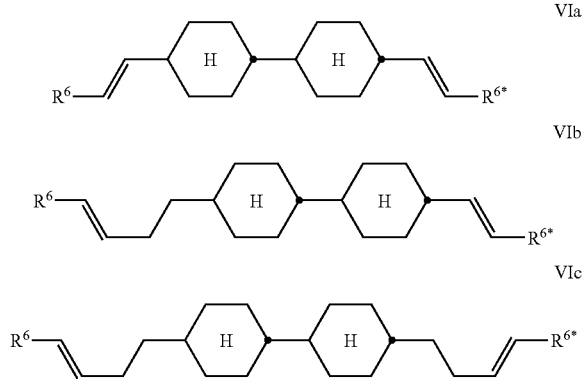
VIa
VIb
VIc
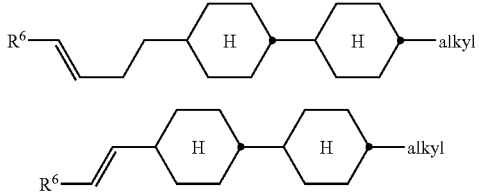
VId
VIe
in which
R⁶ and R⁶* are each, independently of one another, H, $CH_3$, $C_2H_5$ or $n\text{-}C_3H_7$, and
alkyl is a straight-chain alkyl chain having 1 to 7 carbon atoms.
* * * * *

UNITED STATES PATENT AND TRADEMARK OFFICE
CERTIFICATE OF CORRECTION

PATENT NO.        : 7,048,974 B2                                    Page 1 of 1
APPLICATION NO.   : 10/478502
DATED             : May 23, 2006
INVENTOR(S)       : Muehlfeld et al.

It is certified that error appears in the above-identified patent and that said Letters Patent is hereby corrected as shown below:

On the Title page, title reads "LIQUID CRYSTAL MIXTURES" should read
-- LIQUID-CRYSTALLINE MIXTURES --
On the Title page, Assignee line 2, reads "Berlin" should read -- Darmstadt --
On the Title page, Foreign Application Priority Data should read -- May 25, 2001 (DE) 10125707 --
Column 36, line 28 reads "$CH_9$" should read -- $CH_2$ --
Column 36, line 33 reads "alkoxv" should read -- alkoxy --
Column 38, lines 1-2 read "according to claim 6," should read -- according to claim 1 --

Signed and Sealed this

Sixth Day of March, 2007

JON W. DUDAS
*Director of the United States Patent and Trademark Office*